(12) United States Patent
Walls et al.

(10) Patent No.: US 8,478,107 B2
(45) Date of Patent: *Jul. 2, 2013

(54) V-CHIP DATA PROCESSING FOR DECODER WITH PERSONAL VIDEO RECORDING FUNCTIONALITY

(75) Inventors: Frederick G Walls, Tustin, CA (US); Sandeep Bhatia, Bangalore (IN); Joshua J Stults, Irvine, CA (US); Vijayanand Aralaguppe, Bangalore (IN); Sherman (Xuemin) Chen, San Diego, CA (US); Daniel Z Simon, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 1467 days.

This patent is subject to a terminal disclaimer.

(21) Appl. No.: 12/055,847

(22) Filed: Mar. 26, 2008

(65) Prior Publication Data

US 2008/0232771 A1    Sep. 25, 2008

Related U.S. Application Data

(63) Continuation of application No. 10/166,824, filed on Jun. 11, 2002, now Pat. No. 7,366,397, which is a continuation-in-part of application No. 09/933,231, filed on Aug. 20, 2001, now Pat. No. 7,174,085.

(60) Provisional application No. 60/361,130, filed on Feb. 28, 2002, provisional application No. 60/361,154, filed on Mar. 1, 2002.

(51) Int. Cl.
*H04N 9/80* (2006.01)

(52) U.S. Cl.
USPC .......................... 386/248; 386/252

(58) Field of Classification Search
USPC ........................... 386/48, 252–253, 261–262
See application file for complete search history.

(56) References Cited

U.S. PATENT DOCUMENTS

| 5,583,576 | A | 12/1996 | Perlman et al. |
| 5,973,683 | A | 10/1999 | Cragun et al. |
| 5,995,160 | A | 11/1999 | Rumreich |

FOREIGN PATENT DOCUMENTS

EP          1001614 A1    5/2000

OTHER PUBLICATIONS

ATSC Digital Television Standard, ATSC Standard A/53, SCTE DVS/018, Sep. 16, 1995.
Standard for Carriage of NTSC VBI Data in Cable Digital Transport Streams, SCTE DVS/053, Jul. 11, 2000.
SCTE Proposed Standard Method for Carriage of Closed Captions and Non-real Time Sampled Video, SCTE DVS/157, Oct. 23, 1998.
Transport of Content Advisory Information Using Extended Data Service, EIA Standard EIA-744, Dec. 1998.
Corrigendum 1 to DVS/053 Rev. 6, SCTE DVS/259, Apr. 6, 2000.
Line 21 Data Services, EIA Standard EIA-608, Oct. 2000.
EIA-608-A, EIA Standard, Dec. 1999.

(Continued)

*Primary Examiner* — Thai Tran
*Assistant Examiner* — Nigar Chowdhury
(74) *Attorney, Agent, or Firm* — Thomas|Horstemeyer, LLP

(57) ABSTRACT

Systems and method for processing v-chip data for an MPEG-2 decoder with personal video recording functionality are provided. In one example, a system that processes V-Chip data with personal video recording functionality may include a data transport engine and a video decoder. The video decoder may be coupled to the data transport engine and may be adapted to parse out V-Chip data.

25 Claims, 6 Drawing Sheets

OTHER PUBLICATIONS

EIA/CEA-608-B, EIA Standard, Oct. 2000.

SMPTE Standard, for Television—Composite Analog Video Signal—NTSC for Studio Applications, 1999.

International Telecommunication Union, Conventional Television Systems, 1998.

CEB1-A, EIA Bulletin, Dec. 1998.

International Telecommunication Union, Transmission of Non-telephone Signals, Feb. 1995.

V-CHIP DATA PROCESSING FOR DECODER WITH PERSONAL VIDEO RECORDING FUNCTIONALITY

RELATED APPLICATIONS

The present application is a continuation of U.S. patent application Ser. No. 10/166,824, filed Jun. 11, 2002, now U.S. Pat. No. 7,366,397 which is a continuation-in-part of U.S. patent application Ser. No. 09/933,231, entitled "Apparatus and Method of Seamless Switching between a Live DTV Decoding and a PVR Playback," filed on Aug. 20, 2001, now U.S. Pat. No. 7,174,085 which makes reference to, claims priority to and claims benefit from U.S. Provisional Patent Application Ser. No. 60/361,130, entitled "V-Chip Data Processing for MPEG-2 Decoder with Personal Video Recoding Functionality," filed on Feb. 28, 2002 and U.S. Provisional Patent Application Ser. No. 60/361,154, entitled "Time-Base Management for MPEG Decoding with Personal Video Recording (PVR) Functionality," filed on Mar. 1, 2002.

INCORPORATION BY REFERENCE

The above-referenced United States applications are hereby incorporated herein by reference in their entirety.

BACKGROUND OF THE INVENTION

A Personal Video Recorder (PVR) system offers consumers a hard disk or a network-based video cassette recorder (VCR) that digitally records live television (TV) programs while offering the versatility of select playback and associated special features. Live sources for a PVR system include a live digital broadcast and a live analog broadcast.

The so-called "V-Chip" is defined as the technology providing the capability for television sets to block content based on a rating system. Since Jan. 1, 2001, all manufactured television sets that are 13 inches or larger must provide this feature.

The combination of a PVR system and the V-Chip has provided users an opportunity to store and possibly play programming that the user may not have permission to view in light of the V-Chip data. In one example, the user may employ PVR functionality (e.g., trick mode playback) to obtain at least a glimpse of program content that the user may otherwise be unable to view in light of the V-Chip data.

Further limitations and disadvantages of conventional and traditional approaches will become apparent to one of ordinary skill in the art, through comparison of such systems with the present invention as set forth in the remainder of the present application with reference to the drawings.

BRIEF SUMMARY OF THE INVENTION

Aspects of the present invention may be found, for example, in systems and methods that process V-Chip data with personal video recording functionality. In one embodiment, the present invention may provide a method that processes V-Chip data with personal video recording functionality. The method may include the steps of ascertaining the V-Chip data from a transport stream; associating the V-Chip data with the transport stream; storing the V-Chip data and the transport stream in a storage media; accessing the V-Chip data from the storage media; and determining whether to decode the transport stream stored in the storage media as a function of the V-Chip data accessed from the storage media.

In another embodiment, the present invention may provide a system that processes V-Chip data with personal video recording functionality. The system may include a data transport engine and a video decoder. The video decoder may be coupled to the data transport engine and may be adapted to parse out V-Chip data.

In yet another embodiment, the present invention may provide a video decoder that is structured to receive a transport stream and is structured to ascertain V-Chip data from the transport stream.

These and other advantages and novel features of the present invention, as well as details of illustrated embodiments thereof, will be more fully understood from the following description and drawings.

DETAILED DESCRIPTION OF THE INVENTION

To provide parental controls within the set-top environment, one must first consider whether the set-top box is deployed in a closed system. If a closed system is used, it may be feasible to carry content advisory data in the electronic program guide (EPG). However, for a set-top box designed for a possibly unknown head-end, the V-Chip data may be processed, for example, within the set-top box. The parental control may be enforced, for example, by re-encoding the V-Chip data on the video output of the box or by the set-top box (or other device) enforcing the programming block itself.

Figure 1:
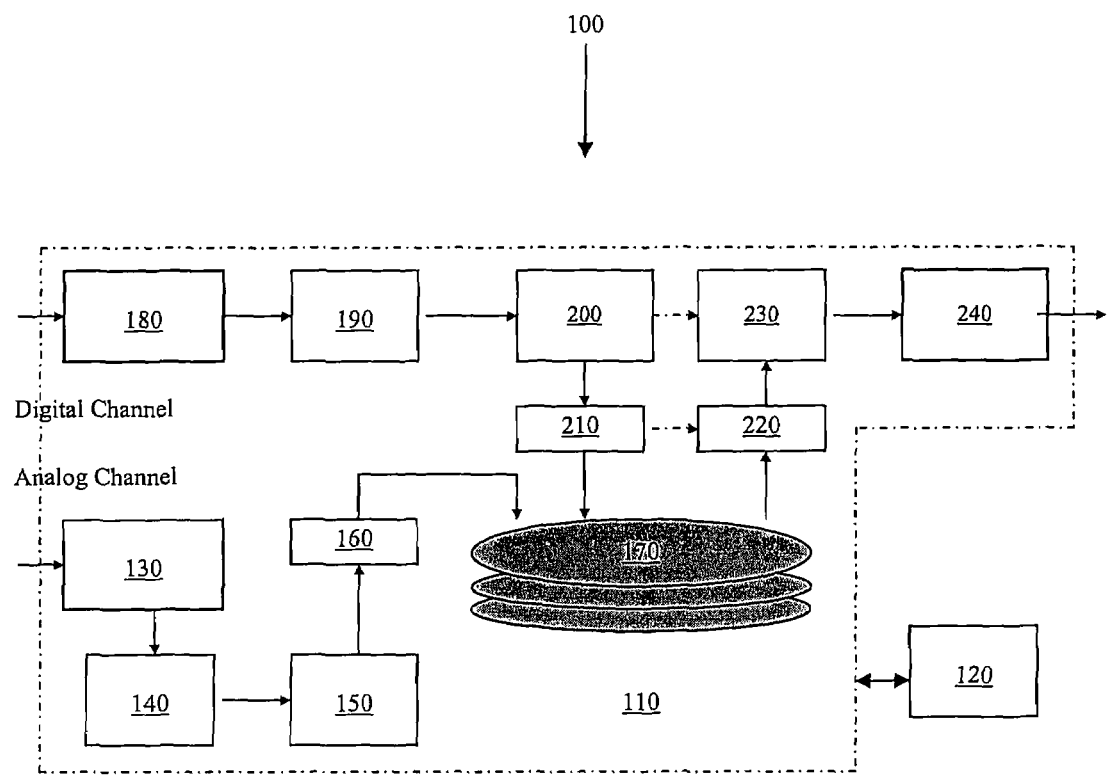
FIG. 1 shows an example of a personal video recorder system according to the present invention.

FIG. 1 shows an example of a personal video recorder (PVR) system according to the present invention. The PVR system 100 may include, for example, a PVR module 110 coupled to a host processor 120. The PVR module 110 may include, for example, an analog demodulator 130, a video decoder (VDEC) 140, a moving pictures experts group (MPEG) encoder 150, a first-in-first-out (FIFO) buffer 160, a hard drive 170, a digital demodulator 180, a forward error correction (FEC) decoder 190, an MPEG data transport processor 200, a FIFO buffer 210, a FIFO buffer 220, an MPEG video decoder 230 and a display processor 240. The couplings and interactions between the various PVR system components and the operation of the PVR system are disclosed in the above-referenced incorporated applications and will not be described in detail herein. In addition, the present invention is not limited to the illustrated embodiment, but may also include, for example, other embodiments, parts or aspects thereof also disclosed in the incorporated applications. Thus, for example, the PVR system 100 may also include an audio buffer, an audio decoder and an audio output device which may or may not be integrated, at least in part, with corresponding video components. In addition, some conventional components of the PVR system and their operation may not be described explicitly in the incorporated references or herein, but are known by those of ordinary skill in the art and are not described further.

Figure 2:
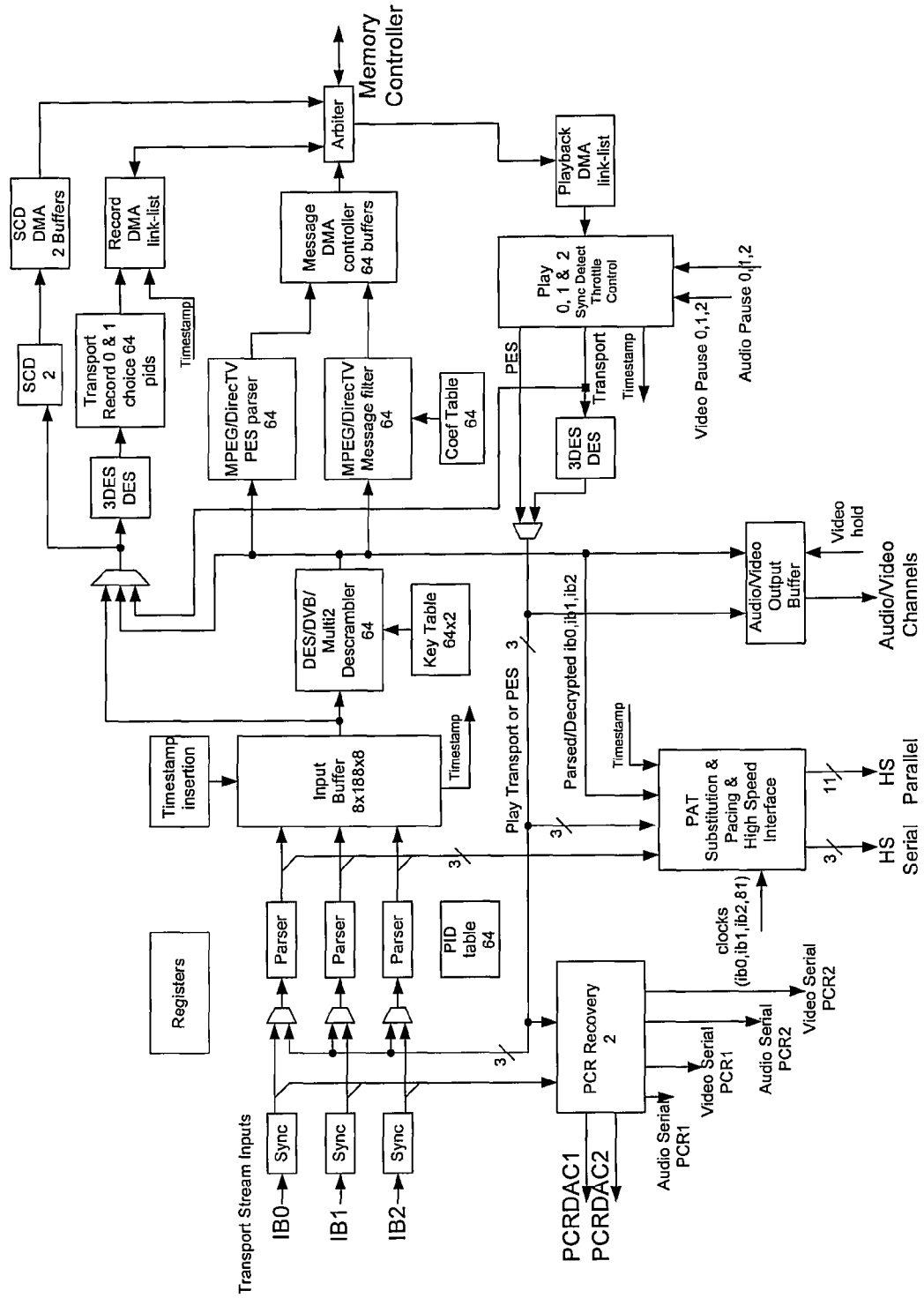
FIG. 2 shows an example of a data transport engine according to the present invention.

FIG. 2 shows an example of a data transport engine according to the present invention. The data transport engine may process, for example, MPEG transport streams before they are sent to the video/audio decompression blocks. The couplings and interactions between the various data transport components and the operation of the data transport engine are disclosed in the above-referenced incorporated applications and will not be describe in detail herein. In addition, the present invention is not limited to the illustrated embodiment, but may also include, for example, other embodiments, parts or aspects thereof disclosed in the incorporated applications. In addition, some conventional components of the data transport engine and their operation may not be included in the incorporated references or herein, but are known by those of ordinary skill in the art and are not described further.

Figure 3:
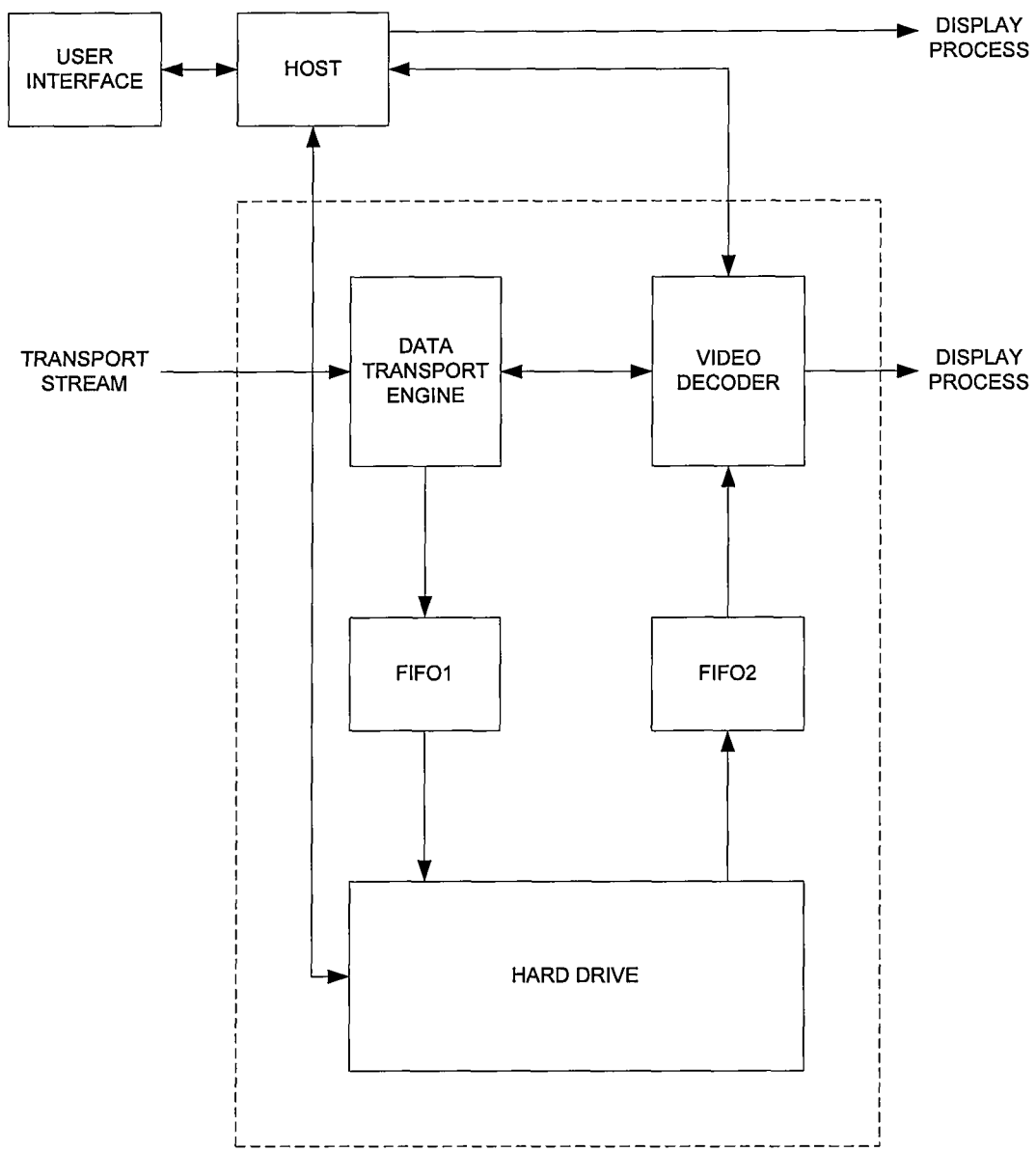
FIG. 3 shows a block representation of an example of a system that processes V-Chip data according to the present invention.
Figure 4:
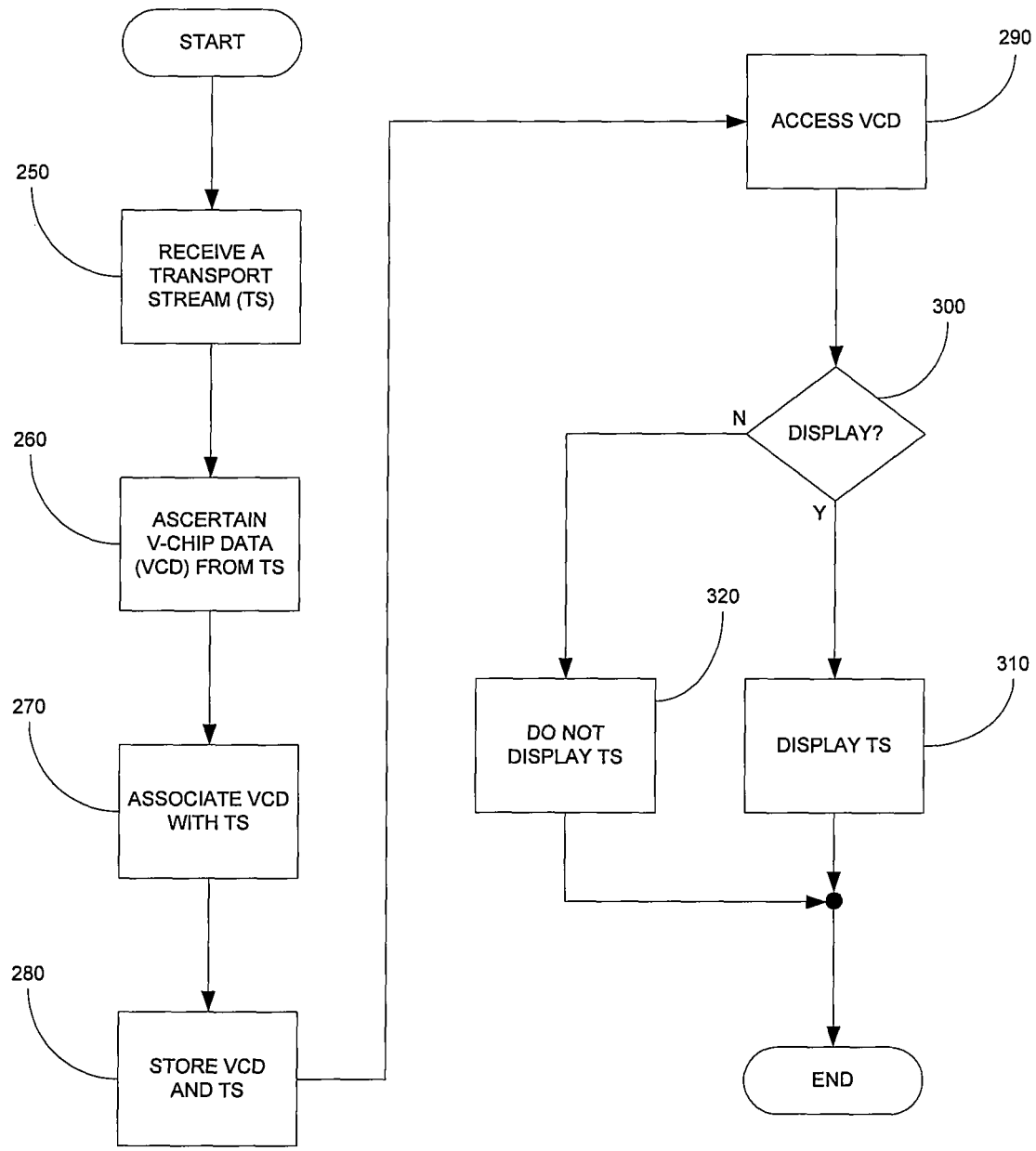
FIG. 4 shows a flowchart illustrating an example of a method that processes V-Chip data according to the present invention.

FIG. 3 and FIG. 4 respectively show an example of a system and a method that process V-Chip data with PVR functionality according to the present invention.

An example of a system that processes V-Chip data with PVR functionality according to the present invention may include, for example, a user interface, a host, a data transport engine, a video decoder, a FIFO1 buffer, a FIFO2 buffer and a hard drive. The present invention may also contemplate using other equivalent structures such as, for example, other types of memory and other types of storage media. In addition, although shown as separate components, the present invention may also include different combinations of integration or even the splitting up of components into separate sub-components. Thus, for example, the FIFO1 buffer and the FIFO2 buffer may be part of a unified SDRAM. The dashed box may represent, for example, a set top box that receives a transport stream. The user interface may be coupled to the set top box via the host, which may include a host processor. The user interface may include a keyboard, graphical interface, mouse, keypad, remote control, touch-sensitive screen, etc. The user interface may, for example, be used to enter information so that the host, for example, may determine whether the user has permission to view the programming associated with the V-Chip data.

As illustrated in FIG. 3, the user interface is coupled to the host which, in turn, is coupled to the display process, the hard drive and the video decoder. The video decoder is coupled to the data transport engine, the FIFO2 buffer and the display process. The data transport engine is coupled to the incoming transport stream and the FIFO1 buffer. The transport stream may include, for example, MPEG data. The FIFO1 and FIFO2 buffers are each coupled to the hard drive and may be coupled to each other. In one example, the display process may include a display engine and the video decoder may include a soft decode engine.

An example of a method that processes V-Chip data with PVR functionality according to the present invention may include some of the following steps. In step 250, a transport stream may be received, for example, by the PVR system. In one example, the transport stream may be received by the data transport engine of the PVR system. In one example, the data transport engine may copy the transport stream or part thereof (e.g., the audio stream and the video stream) to the hard drive via the FIFO1 buffer. A direct memory access (DMA) engine may be employed to assist in the transfer of information between the buffers and the hard drive. The data transport engine may also copy the transport stream to the video decoder and, in particular, copy the transport stream to the soft decode engine of the video decoder.

In step 260, V-Chip data is ascertained from the transport stream. V-Chip data may be carried, for example, in MPEG-2 video elementary stream as picture level user data. The formats (or syntax) of such a carriage may be specified by, for example, ATSC A/53, SCTE in DVS/053 or SCTE in DVS/157 as described in, for example, ATSC Standard A/53 (1995), SCTE DVS/018, "ATSC Digital Television Standard"; SCTE DVS/053 (2000), "Standard for Carriage of NTSC VBI Data in Cable Digital Transport Streams"; or SCTE DVS/157 (1998), "SCTE Proposed Standard for Carriage of Closed-Captions and Non-Real Time Sampled Video". Each the above-described references are incorporated by reference in their entirety.

In one example, the soft decode engine is programmed to parse out the V-Chip data and to communicate at least the V-Chip data to the host. In another example, during a record process, the data transport engine may send the MPEG data to the record channel and to the MPEG video decoder. Since the MPEG video decoder may include a logically dedicated input for each packet or package identifier (PID) parser, the MPEG video decoder may treat the data as an independent incoming data stream. In addition, since the decoder includes a soft engine, the decoder may be programmed to process, for example, the user picture data in firmware.

In step 270, the V-Chip data is associated with the transport stream. In one example, the V-Chip data is associated (e.g., by the host) with particular video and/or audio frames in the transport stream. In another example, the MPEG video decoder simply outputs the picture user data fed into the MPEG video decoder. An interrupt flag may be set to indicate that the data is available. Then, the host may parse the user data and retrieve, for example, the closed-caption data. The host may parse the extended data service (XDS) data to retrieve a content rating. The content rating may then be passed back to a PVR table generator to indicate the content rating in a navigation table.

The host software may be adapted to support the extracting of V-Chip data from, for example, ATSC streams. See, e.g., ATSC Standard A/53 (1995), SCTE DVS/018, "ATSC Digital Television Standard". The host may read the user data from the MPEG decoder after each frame. It may then filter the closed caption data from the user data using the designated fields (e.g., the cc_valid and cc_type fields). It may parse the resulting stream for XDS packets. When a full packet of v-chip data is recovered, the host may update the current program rating by passing the two content rating bytes through a callback function. In another example, the user data parser may be integrated with the MPEG video decoder to reduce the interventions by the host.

Although ATSC-1 standard format (e.g., A/53) may have been used in some examples, the software may be extended to support other standards such as, for example, SCTE in DVS/053, SCTE in DVS/157, etc. Some of these standards may be described, at least in part, in the following exemplary documents: ATSC Standard A/53 (1995), SCTE DVS/018, "ATSC Digital Television Standard"; SCTE DVS/053 (2000), "Standard for Carriage of NTSC VBI Data in Cable Digital Transport Streams"; and SCTE DVS/157 (1998), "SCTE Proposed Standard for Carriage of Closed-Captions and Non-Real Time Sampled Video". Thus, for example, the reader may be extended to other formats for closed-caption carriage.

In step 280, the V-Chip data and the associated transport stream are stored. The host may store the V-Chip data and the associated audio frames and/or video frames in the hard disk, possibly via the FIFO1 buffer.

In step 290, the host accesses the V-Chip data, for example, during playback. In query 300, the host determines whether the associated audio frames and/or video frames should be displayed. The host may determine whether to display as a function of the V-Chip data and user information that may have been provided via the user interface. In one example, the host determines whether the user has permission to view the audio frames and/or video frames associated with the relevant V-Chip data. If the user does have permission, then, in step 310, the associated audio frames and/or video frames are displayed. If the user does not have permission, then, in step 320, the audio frames and/or the video frames associated with the V-Chip data are not displayed. The step of not displaying the associated audio frame and/or video frame may include the step of displaying a blue screen, a blank screen, a message, etc. The host may direct the video decoder not to decode the associated frames or may direct the display process (e.g., the display engine) not to display the associated frames. In one example, the V-Chip data is re-encoded on the video output. The display process may determine whether or not to display the associate frames. In another example, the V-Chip data is used to block content directly.

Some examples for handling V-Chip data during record according to the present invention are described below. However, the present invention may also contemplate other examples for handling V-Chip data other than the below-described examples. For example, the present invention may include aspects of conventional systems and processes for handling V-Chip data.

Figure 5:
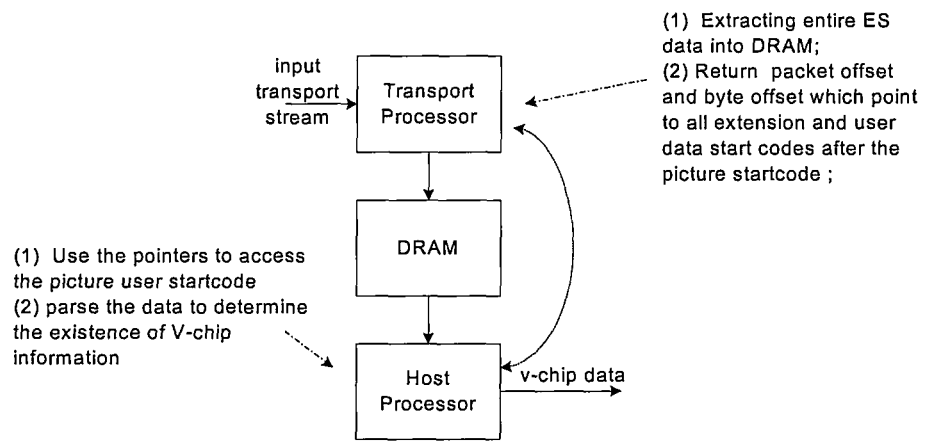
FIG. 5 shows a block representation illustrating an example of a system and a process for handling V-chip data during record according to the present invention.

FIG. 5 shows a block representation illustrating an example of a system and a process for handling V-Chip data during record according to the present invention. Pointers may be returned with all the data stored in DRAM. The data transport engine may store all the data into DRAM and may return the packet offset and byte offset, pointing to, for example, all the Extension and User data start codes after the Picture Start code until another Slice or Non-Slice start code (e.g., other than Extension and User) is encountered. The host may pick up the pointers to the User Start code and parses the data to determine the existence of V-Chip information.

In this example, V-Chip handling channel may be treated almost as other channels of Video Transport processors. Packet processing may take approximately 75% of the time as compared to a decode/record channel. However, the Host Processor may search every User data to determine the existence of V-Chip data. All the data may be stored into the DRAM.

Figure 6:
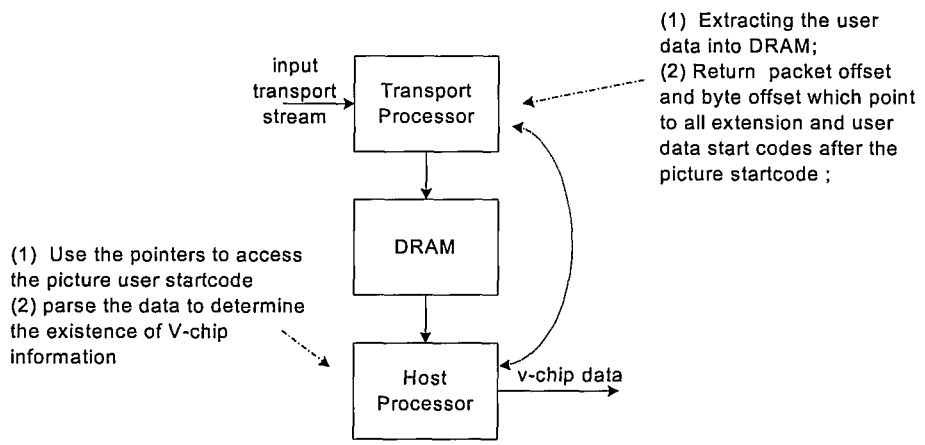
FIG. 6 shows a block representation illustrating an example of a system and a process for handling V-chip data during record according to the present invention.

FIG. 6 shows a block representation illustrating an example of a system and a process for handling V-Chip data during record according to the present invention. Pointers may be returned with User data in DRAM. The data transport engine may store only user data into DRAM and may return the packet offset and byte offset, pointing to, for example, all the User data start codes after the Picture start code until another Slice or Non-slice start code (e.g., other than Extension and User) is encountered. The host may pick up the pointers and may parse the User data to determine the existence of V-Chip information.

In this example, V-Chip handling channel may be treated almost as other channels of Video Transport processors. However, the burden of a V-Chip processing on the video transport may be greater for packets containing the User data. The Host Processor may search every User data to determine the existence of V-Chip data.

Figure 7:
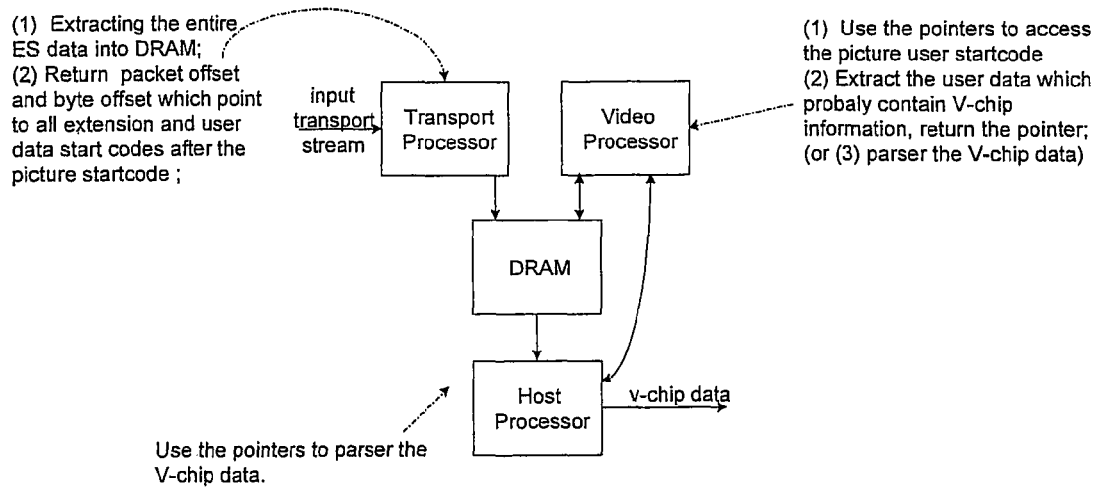
FIG. 7 shows a block representation illustrating an example of a system and a process for handling V-chip data during record according to the present invention.

FIG. 7 shows a block representation illustrating an example of a system and a process for handling V-Chip data during record according to the present invention. Pointers to User data containing V-Chip may be returned with all data stored into DRAM. The data transport engine may store all the data into DRAM and may pass the packet offset and byte offset to the video decoder, pointing to, for example, all the User data start codes after the Picture start code until another Slice or Non-slice start code (e.g., other than Extension and User) is encountered. The video decoder may parse through the User data and may identify the User data containing V-Chip information. The video decoder may either return the pointer to the User data containing V-Chip and/or the V-Chip data to the host.

In this example, V-Chip handling channel may be treated almost as other channels of Video Transport processors. Packet processing may take approximately 75% of the time as compared to a decode/record channel. The Host CPU may be relieved from parsing the User data to identify the V-chip information. However, the burden of V-Chip processing on video transport may be the same as that of any other channel. The Video processor may be involved, thereby adding to the number of contexts in video processor.

Figure 8:
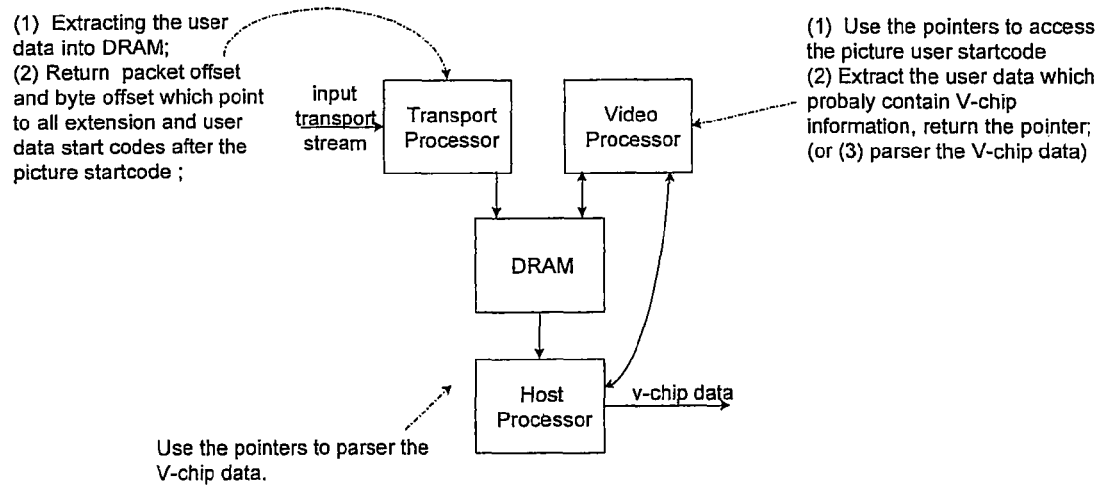
FIG. 8 shows a block representation illustrating an example of a system and a process for handling V-chip data during record according to the present invention.

FIG. 8 shows a block representation illustrating an example of a system and a process for handling V-Chip data during record according to the present invention. Pointers to User data containing V-Chip may be returned with only user data stored into DRAM. The data transport engine may store only User data into DRAM and may pass the packet offset and byte offset to the video decoder, pointing to, for example, all the User data start codes after the Picture start code until another Slice or Non-slice start code (e.g., other than Extension and User) is encountered. The video decoder may parse through the User data and may identify the User data containing V-Chip information. The video decoder may return the pointer to the User data containing V-Chip and/or the V-Chip data to the host.

In this example, V-Chip handling channel may be treated almost as other channels of Video Transport processors. The Host CPU may be relieved from parsing the User data to identify the V-Chip information. However, the burden of V-Chip processing on the video transport may be more or less for packets containing the User data. The video processor may be involved, thereby adding to the number of contexts in video processor.

Thus, it is seen that systems and methods that process V-Chip data are provided. One skilled in the art will appreciate that the present invention can be practiced by other than the preferred embodiments which are presented in this description for purposes of illustration and not of limitation, and that the present invention is limited only by the claims that follow. It is noted that equivalents for the particular embodiments discussed in this description may practice the present invention as well.

What is claimed is:

1. A method for processing V-Chip data with personal video recording functionality, comprising:
 ascertaining the V-Chip data from a video bitstream;
 associating the V-Chip data with the video bitstream;
 storing the V-Chip data and the video bitstream in a storage media;
 accessing the V-Chip data from the storage media;

determining whether to display the video bitstream stored in the storage media as a function of the V-Chip data accessed from the storage media; and encoding the V-Chip data accessed from the storage media onto a video output if it is determined to not display the video bitstream.

2. The method according to claim 1, further comprising receiving the video bitstream.

3. The method according to claim 2, wherein receiving the video bitstream comprises receiving the video bitstream via a data transport processor.

4. The method according to claim 1, further comprising transmitting the video bitstream to a soft decode engine.

5. The method according to claim 1, wherein ascertaining the V-Chip data from a video bitstream comprises parsing the transport stream for the V-Chip data.

6. The method according to claim 1, wherein ascertaining the V-Chip data from a video bitstream comprises parsing out the V-Chip data from the video bitstream with a decoder.

7. The method according to claim 6, further comprising communicating the parsed out V-Chip data to a host.

8. The method according to claim 1, further comprising, subsequent to ascertaining the V-Chip data, communicating the ascertained V-Chip data to a host.

9. The method according to claim 1, wherein associating the V-Chip data with the video bitstream comprises associating, via a host, the V-Chip data with the video bitstream.

10. The method according to claim 1, wherein accessing the V-Chip data from the storage media comprises accessing, via a host, the V-Chip data from the storage media.

11. The method according to claim 10, wherein determining whether to display the video bitstream stored in the storage media as a function of the V-Chip data accessed from the storage media comprises instructing, via the host, a decoder to decode the video bitstream associated with the V-Chip data.

12. The method according to claim 1, wherein determining whether to display the video bitstream stored in the storage media as a function of the V-Chip data accessed from the storage media comprises determining whether to decode the video bitstream stored in the storage media as a function of the V-Chip data accessed from the storage media.

13. The method according to claim 1, further comprising, if it is determined to display the video bitstream, then displaying the associated video bitstream from the storage media.

14. The method according to claim 1, further comprising, if it is determined to not display the video bitstream, then not displaying the associated video bitstream from the storage media.

15. The method according to claim 1, further comprising, if it is determined to not display the video bitstream, then displaying a message based at least in part on the encoded V-Chip data.

16. A system that processes V-Chip data with personal video recording functionality, comprising:
a data transport engine; and
a parsing circuit coupled to the data transport engine, the parsing circuit being adapted to parse out V-Chip data;
wherein the data transport engine is adapted to pass to the parsing circuit information identifying memory locations indicating V-Chip data reference locations.

17. The system according to claim 16, wherein the parsing circuit comprises a soft decode engine, the soft decode engine being adapted to parse out V-Chip data.

18. The system according to claim 17,
wherein the data transport engine receives a transport stream and sends the transport stream to the soft decode engine, and
wherein the soft decode engine parses out the V-Chip data from the transport stream.

19. The system according to claim 18,
wherein the soft decode engine sends the parsed out V-Chip data to a host, and
wherein the host associates the V-Chip data with at least one of a video frame and an audio frame of the transport stream.

20. The system according to claim 19, wherein the V-Chip data and the at least one of the associated video frame and the associated audio frame of the transport stream are stored in a storage media.

21. The system of claim 16, wherein the parsing circuit is adapted to utilize the passed information to parse through user data to identify user data containing V-Chip information.

22. The system of claim 21, wherein the parsing circuit is adapted to provide to a host the identified user data or a pointer to the user data.

23. The system of claim 16, wherein the parsing circuit is a video decoder.

24. The system of claim 16, wherein the parsing circuit is a host.

25. A system for processing V-Chip data with personal video recording functionality, the system comprising at least one component adapted to, at least:
ascertain the V-Chip data from a video bitstream;
associate the V-Chip data with the video bitstream;
store the V-Chip data and the video bitstream in a storage media;
access the V-Chip data from the storage media;
determine whether to display the video bitstream stored in the storage media as a function of the V-Chip data accessed from the storage media; and
encode the V-Chip data accessed from the storage media onto a video output if it is determined to not display the video bitstream.

* * * * *